May 31, 1927.
A. JACOBOWITZ
1,630,945
CUTTING DISK FOR HIGH SPEED FRICTION SAWS
Filed Aug. 27, 1925
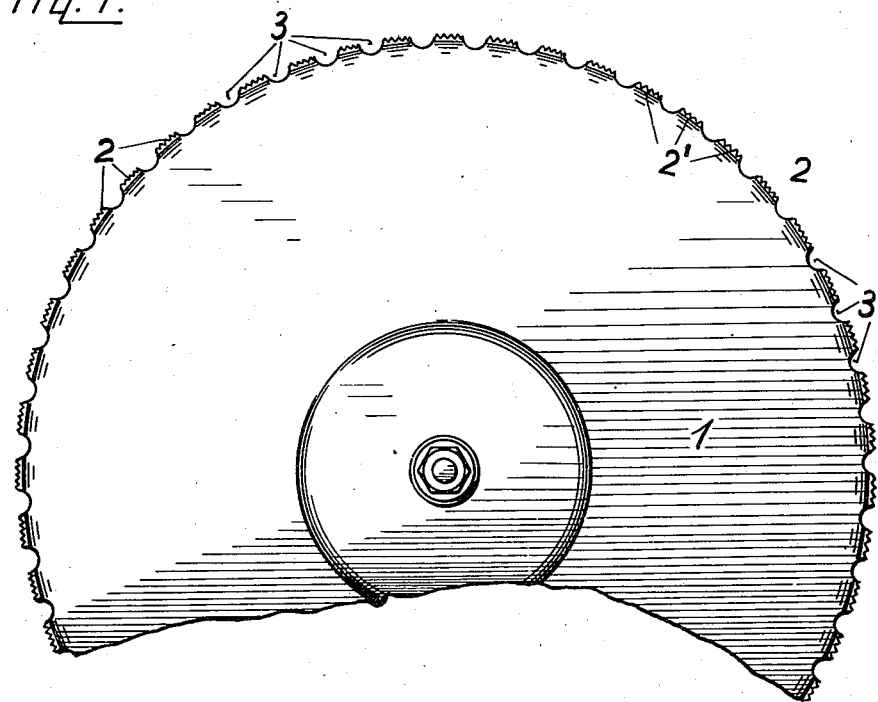
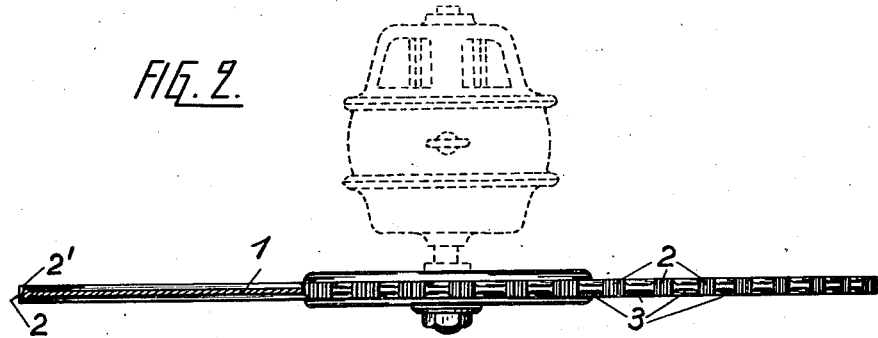
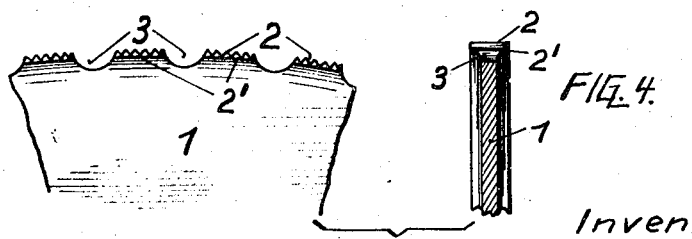
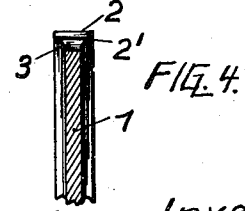
Inventor:
Adolf Jacobowitz
by
Atty.

Patented May 31, 1927.

1,630,945

UNITED STATES PATENT OFFICE.

ADOLF JACOBOWITZ, OF NUREMBERG, GERMANY.

CUTTING DISK FOR HIGH-SPEED FRICTION SAWS.

Application filed August 27, 1925, Serial No. 52,915, and in Germany May 18, 1925.

This invention relates to a cutting disk for high speed friction saws, provided with a thickened and enlarged disk edge and the characterizing feature of the present invention is, that the disk edge, which, on its circumference is roughened or chamfered by cording or furrowing, is interrupted by indentations arranged in a certain distance from each other. By the provision of said indentations it is now possible, as practical tests have shown, to cut advantageously very hard materials as steel, grey cast iron and chilled cast iron parts, without the recessed (roughened or chamfered) disk edge being filled up or flattened, whereby the cutting efficiency is reduced.

The indentations or recesses tend to fully retain the corded or furrowed shape of the disk circumference even when very hard material is to be worked upon and the cut is always trim and smooth throughout.

This favorable effect is based on the fact, that the particles of material, which are separated and dislodged from the cutting line by the quickly revolving cutting disk, shortly after their separation enter from the cutting line into the indentations and are conducted away by the latter, so that said particles can not obstruct in any manner the advancing movement of the cutting disk. This operation is further assisted by the air current, produced by the rapid revolution of the cutting disk, said air current being led by the indentations or recesses into the cutting line immediately in front of the cutting edge.

In the accompanying drawing, in which one form of construction of my improved cutting disk is illustrated;

Fig. 1 is a side view of the same,

Fig. 2 is a plan view, partly horizontal section, of the cutting disk with the driving motor, while Figs. 3 and 4 show in an enlarged scale a part of the cutting disk in side view and vertical section.

In the drawing the reference numeral 1 indicates the cutting disk, which is made of sheet metal and is provided with a more or less thickened or enlarged edge $2^1$. This edge is roughened at its circumference by cording or recessing, so that the furrows 2 are formed.

In the disk edge indentations 3 are arranged in a certain distance from each other, so that interruptions of the corded or furrowed edge are produced. The indentations 3 have the shape of arc like cavities and are dimensioned and arranged in such a manner, that they can well perform the operation intended for the same (retaining the shape of the corded or furrowed cutting edge even when cutting hard material) and nevertheless do not create any danger for the rapidly revolving cutting disk by the formation of cracks and the like.

I claim:

1. A cutting disk for high speed friction saws, comprising a disk body having a thickened and enlarged edge, said edge being roughened or furrowed at its circumference by cording or recessing and being provided with indentations arranged in a certain distance from each other.

2. A cutting disk for high speed friction saws, comprising a disk body having a thickened and enlarged edge, said edge being roughened or furrowed at its circumference by cording or recessing and being provided with indentations arranged in a certain distance from each other and having the shape of arc like cavities.

In testimony whereof I affix my signature.

ADOLF JACOBOWITZ.